Nov. 26, 1929.　　　R. F. ORDWAY　　　1,737,386
AUTOMOBILE SIGNAL
Filed Feb. 7, 1928　　　2 Sheets-Sheet 1
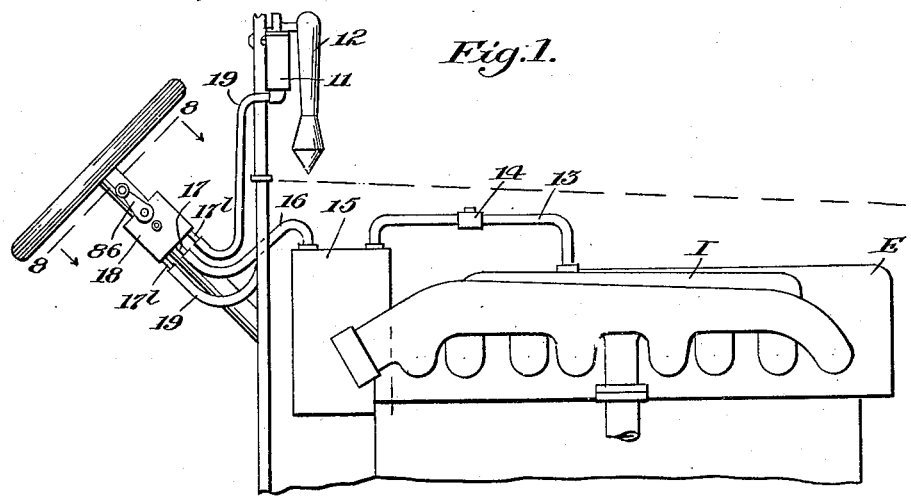
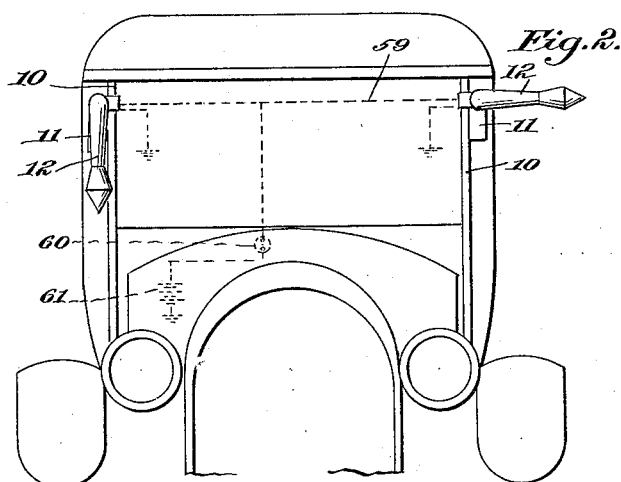
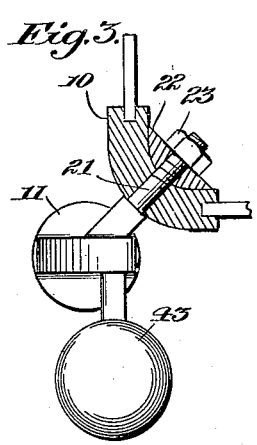
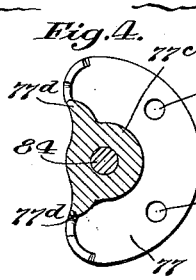
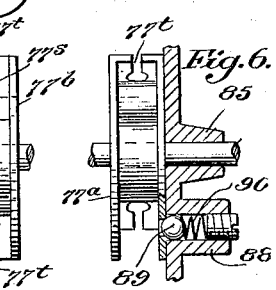
Inventor:
Ralph F. Ordway, Nov. 26, 1929.  R. F. ORDWAY  1,737,386
AUTOMOBILE SIGNAL
Filed Feb. 7, 1928    2 Sheets-Sheet 2
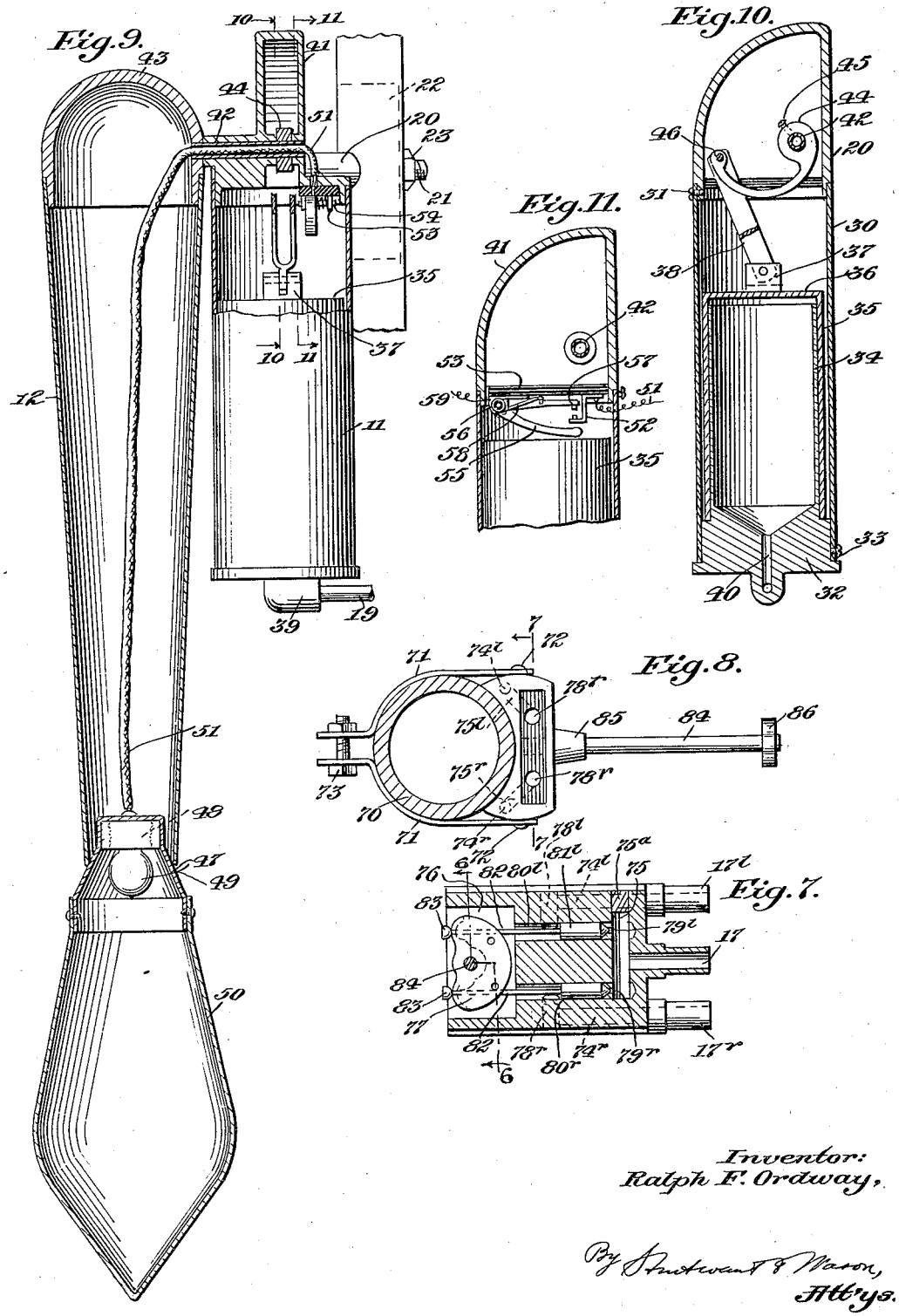
Inventor:
Ralph F. Ordway,
By Sturtevant & Mason,
Attys.

Patented Nov. 26, 1929

1,737,386

UNITED STATES PATENT OFFICE

RALPH FREEMAN ORDWAY, OF BARRINGTON, RHODE ISLAND, ASSIGNOR OF ONE-HALF TO ARCHIBALD BIRTWELL, OF EAST PROVIDENCE, RHODE ISLAND

AUTOMOBILE SIGNAL

Application filed February 7, 1928. Serial No. 252,507.

This invention relates to improvements in signaling systems, and more especially to vacuum operated direction signals for automobiles.

It has heretofore been proposed to employ the partial vacuum existing in the intake manifold of an automobile engine or produced in another manner, for the actuation of a direction signaling device. The present invention relates to improvements in such structures to avoid certain difficulties which have been encountered in practice: and specifically includes improvements in the mechanical construction and assemblage of the several parts.

One of the objects of the present invention is therefore to provide means to stabilize the degree of vacuum produced, and hence the operativeness of the system.

Another object is to provide a simple and easily controlled system for the selection of the operation of the signaling system.

Still another object is a simple and complete assembly of the several parts, with clean cut lines which do not detract from the apperance of the automobile body work and in which the parts producing the operation are housed against injury or the access of dust.

A further object of the invention is the provision of a system of this kind in which no springs are employed, but the several parts are restored to their proper initial positions either by the partial vacuum or by gravity.

A still further object is the provision of an illuminating device for the indicator proper, which is capable of rendering the signal visible in darkness.

A still further object of the invention is the provision of a device of this kind with a simple and adequate means for holding it rigidly in position at a corner of the vehicle body work.

With these and other objects in view as will appear in the course of the following specification and claims, one form of practicing the invention has been illustrated on the accompanying drawings, in which:

Figure 1 is a conventional diagram of certain parts of an automobile, represented in side elevation.

Fig. 2 is a fragmentary front elevation of an automobile body.

Fig. 3 is a horizontal section through a corner of the vehicle body, showing the attaching device for a signal according to the present invention.

Fig. 4 is a section on line 4—4 of Fig. 5, of the operating member for the multiple control valve.

Fig. 5 is a view of the operating member of Fig. 4 in the direction of the arrow in that figure.

Fig. 6 is a fragmentary view on line 6—6 of Fig. 7.

Fig 7 is a sectional view of the multiple valve member substantially on line 7—7 of Fig. 8.

Fig. 8 is a sectional view through a steering column, substantially on line 8—8 of Fig. 1, but on an enlarged scale.

Fig. 9 is a vertical section through the operating cylinder, with the indicating arm vertical, the section passing through the axis of the arm.

Fig. 10 is a sectional view of the operating cylinder, substantially on line 10—10 of Fig. 9.

Fig. 11 is a similar view taken substantially on line 11—11 of Fig. 9, but looking in the opposite direction and showing the switch for controlling the illuminating portion.

In these drawings, the vehicle body is represented as having the front corner posts 10, 10 at each of which is mounted a power cylinder 11 on which is pivotally mounted an arm 12 which is adapted to be swung by the cylinder from a vertical non-indicating position to a horizontal indicating position: as illustrated in Fig. 2. The engine E of the automobile is provided as usual with an intake manifold I from which is tapped a branch conduit 13 leading through a check or non-return valve 14 to a reservoir 15, and thence by a conduit 16 to the central connection 17 of a multiple control valve body 18 which has the separate lateral connections 17ʳ and 17ˡ leading by conduits 19 to the respective power cylinders 11 at the two sides of the vehicle. It will be understood that these power cylinders are constructed symmetrically, so that the one at the right will project its indicating arm 12 outward to the right, while the one at the left will project its arm outward to the left.

Each of the operating cylinders 11 has a cap 20 (Fig. 9) with which is joined a screw-threaded stem 21 which is adapted to pass through a hole bored in the corner post 10 at the respective corner of the vehicle body, this post usually being of a broad U-shape as shown in section in Fig. 3. A fitting washer 22 is designed for each shape of corner post to fit the concave side of the same, and is provided with a flat surface to receive the tightening nut 23 for the threaded spindle 21. It will be noted that the threaded spindle 21 extends obliquely rearward and inward with respect to the operating cylinder 11, so that this cylinder is supported at the corner of the vehicle where it is of substantially no encumbrance to either vision or the handling of the vehicle, and the operating arm 12 is carried immediately in front of the cylinder where its operation may be noted by the driver from the interior of the vehicle, and where it is immediately visible to a pedestrian or policeman or another driver observing the signal, either from the front or rear of the vehicle: the arrangement of the two devices in line with each other in the direction of movement of the vehicle reduces the air resistance of the structure: and by reason of their particular conformation and location, the increase of air resistance is very small.

Each of the power cylinders 11 is represented in Figs. 9 and 10 as comprising an outer casing 30 having the cap 20 joined thereto by retaining screws 31 at the top: and being provided with a base member 32 likewise joined to the casing 30 by the screws 33. The base member has an upwardly extending cylindrical sleeve 34 which provides between it and the casing 30 an annular space to receive the piston proper 35, which is closed at its upper end by the head 36 bearing the upstanding lug 37 for the piston link 38. The conduit 19 of the respective device leads to a boss 39 formed integrally with the base member 32, and drilled to provide a passage 40 establishing communication between the conduit 19 and the interior of the upstanding sleeve 34.

The upper closing member 20 for the casing 30 has an upstanding hood 41 formed integrally therewith, and is illustrated as having vertical flat sides with a top rounded on an arc concentric with the axis of a hollow shaft 42, illustrated as formed integrally with the dome 43 of the arm 12. It will be understood that the arcuate shape of the hood 41 is preferably symmetrical with respect to the devices at right and left.

Mounted on the hollow shaft 42 within the hood 41 is a crank arm 44, which is caused to move with the shaft by a pin or screw 45. The upper end of the link 38 is connected to the crank arm 44 by a pivot 46.

The preferred shape for the signal arm 12 is the fulcrum of a cone having a very acute apex angle, and it is illustrated as formed of the dome 43 having a rabbet at its cut off end to receive the frusto-conical jacket 12, which at its lower end is secured to a reflector 47, which in turn supports a lamp socket 48 for the illuminating bulb 49. A large transparent or translucent indicator head 50, formed for example of colored celluloid, is secured to the outer edge of the reflector 47 in an appropriate manner, so that the bulb 49 is protected, and sheds its light over the inner surface of this indicator head 50 to illuminate the same.

One conductor from the bulb 49 is preferably grounded through the arm 12 and the power cylinder parts to the frame of the vehicle, and hence receives current from the usual storage battery located on the vehicle. The other terminal of the bulb is connected through a conductor 51 which leads through the hollow shaft 42 and then downwardly through a hole in the head 20, and is connected to a contact member 52 carried on an insulating plate 53 secured within the downwardly projecting skirt 54 of the closed member 20. A rocker 55 is pivotally mounted on an insulating bracket 56 on this insulating plate 53, so that it is free to rock upwardly and downwardly to present its contact 57 in and out of engagement with the contact 52. It is preferred to employ a spring 58 curled about the pivot in the bracket 57 and the rocker 55 to urge this rocker downwardly to close the contact: while the piston 35 in its upward movement engages the rocker at the upper limit of stroke of the piston 35 to separate the contacts and break the circuit. A further conductor 59 leads from the rocker 55 to an appropriate switch 60 located, for example, on the dashboard and thence to the other side of the vehicle battery 61. This circuit arrangement has been conventionally and diagrammatically represented in Fig. 2 as connecting the two bulbs of the arms 12 through the same switch 60.

The multiple valve body is fastened to the steering column 70 by the clamping straps 71 passing about the column and secured at one end by screws 72 to the valve body and clamped together at the other end by the bolt 73. This valve body is provided at its lower end with the connections $17^r$, $17^l$ referred to above, which are hollow and lead to longitudinal passages $74^l$, $74^r$ at the sides of the valve body, and with the hollow connection 17 leading to a transverse passage 75 which is closed after drilling by the plug $75^a$. At the upper end of the valve body is a cavity 76 to receive the operating member 77 (Figs. 4, 5 and 6). At the bottom of the cavity 76 are drilled the longitudinal passages 78$^r$, 78$^l$ which communicate with the transverse passages 75 through the valve seats 79$^r$, 79$^l$. Transverse passages 80$^r$, 80$^l$ lead from the respective passages 74$^r$, 74$^l$ to the passages 78$^r$, 78$^l$. Slidably mounted in each of the passages 78$^r$, 78$^l$ is a cylindrical valve body 81$^r$, 81$^l$ having a conical end to be seated on the respective seat 79$^r$, 79$^l$ and provided with a respective stem 82 having an enlarged head 83 to be engaged by the operating member 77. It will be noted that when the respective valve body 81$^r$, 81$^l$ is upon its seat 79$^r$, 79$^l$, there is a free passage from the atmosphere through the cavity 76 and the upper end of the passage 78$^r$, or 78$^l$, transverse passage 80$^r$, or 80$^l$, and longitudinal passage 74$^r$, or 74$^l$ with the connections 17$^r$ or 17$^l$, so that the respective power cylinder 10 may be restored to atmospheric pressure. On the other hand, if either one of the heads 83 and its stem 82 is pulled freely to its uppermost position, then the valve body 81$^r$, or 81$^l$ will close this communication with the atmosphere, and will have been drawn back so far that the suction or partial vacuum in the connection 17 is transmitted by the transverse passage 75 through the lower end of the respective longitudinal passage 78$^r$, 78$^l$ to the respective transverse passage 80$^r$, 80$^l$, and thence by the longitudinal passage 74$^r$, 74$^l$ to the respective connection 17$^r$ or 17$^l$. It will further be noted that since a rocking movement of the operating member 77 is required for this, only one of the valve bodies 81$^r$, 81$^l$ may be operated at a time by its movement.

The operating member 77 is fixed to a shaft 78 extending outward through a boss 85 which carries a finger 86 at its outer end, this finger being located at the right of the steering column (Fig. 1) and beneath the rim a distance of about an inch, so that the operator may grasp the steering wheel with his fingers and rotate the wheel without actuation of the device, or by simple movement of a finger slightly away from the wheel, he can cause a rocking of the finger 86 and therewith of the shaft and the operating member 77 to produce a movement of the valve, and hence an actuation of the respective indicating arm.

As shown in Figs. 4, 5 and 6, the operating member 77 has two cheek plates 77$^a$, 77$^b$ formed integrally with a central portion 77$^c$ which is bored through to receive the shaft 84. This central portion also has the lateral wings 77$^d$ which are slotted substantially in a radial plane from each side and formed with the seats 77$^s$ which are adapted to receive the heads 83 of the valve stems, while the valve stems themselves may be inserted and removed through the slots 77$^t$. One of the cheeks 77$^b$ is provided with cavities or holes 87. A boss 88 in the wall of the multiple valve body receives and guides a plunger 89 which is pressed by a spring 90. When the operating member 77 has been rocked by actuation of the finger 86 to one end position, this plunger 89 engages in a cavity 87 and holds the operating member in this position until the operator again slightly displaces the finger 86 from its retained position, whereupon the suction or partial vacuum in the system, including the passage 75, will produce a sufficient tractive effect upon the valve body 81$^r$ or 81$^l$, acting as a piston, to pull the operating member 77 back to the central position: no springs are required for this purpose.

The method of operation of the device is as follows:

So long as the engine is turning over, there is a partial vacuum in the intake manifold I which is transmitted to the reservoir 15 and thence to the control valve body. In the operation of the engine, this sub-atmospheric pressure will fluctuate, but by the employment of the reservoir 15 and the non-return valve 14, the effects of the fluctuation are substantially eliminated.

Prior to the turning of the steering wheel for steering, or at the moment thereof, the vehicle operator moves the finger 86 to cause a rotation of the shaft 84 and therewith a rocking of the operating member 77 whereby one or the other of the valve bodies 81$^r$, 81$^l$ is drawn away from the seat 79$^r$, 79$^l$ to the other end of its bore. The sub-atmospheric pressure prevailing at the connection 17 is thus transmitted by passage 75 and the respective bore according to the direction of movement of the finger 86. Assuming that the vehicle is to turn to the left, the valve body 81$^l$ will have been moved, and the sub-atmospheric pressure is transmitted past the valve seat 79$^l$ in passage 78$^l$ and cross passage 80$^l$, so that the partial vacuum in passage 74$^l$ and at connection 17$^l$ will be transmitted through the respective connecting conduit 19 to the power cylinder at the left side of the vehicle.

In this cylinder the partial vacuum within the sleeve 34 causes an immediate downward movement of the piston 35, and by means of the bifurcated link 38 the crank arm 44 is rotated in a counterclockwise direction in Fig. 10, producing a rotation of the hollow shaft 42 and therewith rocking the indicating arm 12 with its celluloid indicator 50 upward toward a horizontal position, corresponding to a counterclockwise movement in Fig. 10.

At the beginning of the downward movement of the piston 35, it moves away from the lower portion of the rocker 55 and permits this rocker to move clockwise about its pivot under the influence of gravity and/or the spring 58, until the contacts 52, 57 are closed. Assuming that the switch 60 is closed, a circuit is thus completed from the battery 61 through the switch 60 and the conductor 59 to and through the now closed contacts 52, 57 by a conductor 51 to the lamp bulb 49 to illuminate the same, with a return through the frame of the signal arm and the power cylinder and the automobile frame to the grounded other side of the battery 61. It will be noted that this circuit is closed immediately upon the initiation of a downward movement of the power cylinder 35, and hence at the beginning of the rocking movement of the signal arm 12, so that the proposed change of direction is advertised not only by the horizontal position of the arm and the lighting of its indicator, but also by the actual movement of the arm with the indicator lighted.

The movement of the rocking operating member 77 has caused the detent 89 to lock it in its moved position, so that the operating arm remains raised and indicating until the operator gives a slight movement to the finger, 86, sufficient to release the detent 89. The suction within the passage 75 is now sufficient to operate upon the piston valve body $81^1$ to draw it toward the right in Fig. 7, until it is again seated at the seat $79^1$. During this movement the rocker 77 is restored to its initial or central position and is ready for re-operation in either direction. The valve seat $79^1$ serves to assure a closure of the passage 79 and also as a stop to determine the initial position of the rocking operating member 77.

As soon as the valve body $81^1$ has moved past the transverse conduit $80^1$, air may enter through the cavity 76 of the switch body into the longitudinal passage $78^1$, and passing the transverse passage $80^1$ and passage $74^1$, will gain the connection $17^1$, and thence by the corresponding conduit 19 will enter the power cylinder and permit an upward movement of the piston 35, so that the rocking indicating arm 12 may return to the vertical position by the action of gravity.

The operation of the parts for movement of the indicator at the right side of the vehicle for signaling a proposed turn to the right occurs in a similar manner.

It will be noted that the structure is very simply and easily assembled upon a car of any type, by boring holes near the top of the front corner posts to receive the spindles 21 of the respective power cylinders: the packing members or washers 22 being designed according to the shape of the corner posts in the respective type of vehicle. The clamping nut 23 then locks the power cylinder firmly in position.

The invention is not limited to the form of execution shown, but may be employed in many other ways. It is not limited to the employment of any specific source of power, nor to the specific embodiments of elements shown: but may be changed within the scope of the appended claims.

What I claim as new is:

1. In a signaling system, a source of sub-atmospheric pressure, a plurality of power cylinders and signaling arms each connected together for movement upon energization of the respective cylinder, a control valve body, a conduit leading from said source to the valve body, said valve body having passages therein communicating at one end with said conduit and at the other end with the atmosphere, said valve body also having branch passages intermediate the length of said first passages communicating respectively each with a power cylinder, a piston valve for each of said first passages and movable therein to selectively close the communication between said first conduit and the respective branch passage and between the atmosphere and said branch passage, and conduits establishing communication between said branch passages and respective power cylinders.

2. In a signaling system as in claim 1, means to move each of said piston valves from a position in which the respective valve shuts off communication between said first conduit and said branch passage, said piston being returned to such shutting position by the action of the sub-atmospheric pressure.

3. In a signaling system, a source of sub-atmospheric pressure, a conduit communicating with said source and including a valve, a hollow moving piston, a cylinder including a sleeve received within and guiding said piston, said sleeve being in communication with said conduit, and an outer casing enclosing and protecting said moving piston, a hood closing the end of said outer casing, a shaft extending through said hood at a substantial angle to the direction of movement of said moving piston, means connected to said moving piston to rock said shaft, and an indicating arm connected to said shaft externally of said outer casing.

4. In a signaling system, a source of sub-atmospheric pressure, a plurality of suction operated indicating devices, a selecting valve, and conduits connecting said source, said valve and said devices; said valve having a plurality of parallel passages therein, a closure member in each of said passages slidable therein to positions in which communication is established between said source and the respective device and in which said communication is closed, and a rocker mounted on said valve body and having means to engage said closure members so that a selected one may be moved to open communication between said source and the respective device without movement of other such closure members.

5. In a signaling system according to claim 4, a detent to hold said rocker member against return movement whereby to maintain the communication between the source and the selected indicating device.

6. In a signaling system according to claim 4, in which the sub-atmospheric pressure in the conduit from said source serves to return the closure member to its closing position, a detent to hold said rocker member against return whereby the communication is continued, said closure member being adapted upon the release of said detent to return said rocker to its initial or neutral position.

7. In a signaling system for an automobile, a power cylinder including an outer casing having a cylinder sleeve and a moving piston therein, a hood closing the upper end of said casing, a shaft journaled in said hood, an indicating device fixed on said shaft, and a spindle integral with said hood and extending at an angle to the axis of said shaft, said spindle being adapted to be received in an aperture in the corner post of the automobile body, a washer fitting the curvature of the inner side of said post, and a nut to tighten said hood, said corner post and said washer together to secure the power cylinder in position.

8. In a signaling system, a source of subatmospheric pressure, an indicating device including a suction operated piston and an indicating arm moved thereby, a conduit from said source to said device and containing a control valve; said control valve including a shaft, a rocker mounted on said shaft to move the closure element of the valve, and a finger on said shaft, said valve body being mounted on the steering post of the automobile and said finger being located beneath the rim of the steering wheel and extending upward toward the rim of the wheel so that its upper end is at a distance from the rim slightly greater than the size of a finger, so that the hand may be held close to the rim of the steering wheel and the wheel turned without actuation of the device, or by moving the finger away the device may be actuated in accordance with the movement of the steering wheel.

In testimony whereof, I affix my signature.

RALPH FREEMAN ORDWAY.